No. 775,421. PATENTED NOV. 22, 1904.
G. W. HAZEL.
TIDE AND WAVE MOTOR.
APPLICATION FILED APR. 21, 1903.
NO MODEL.
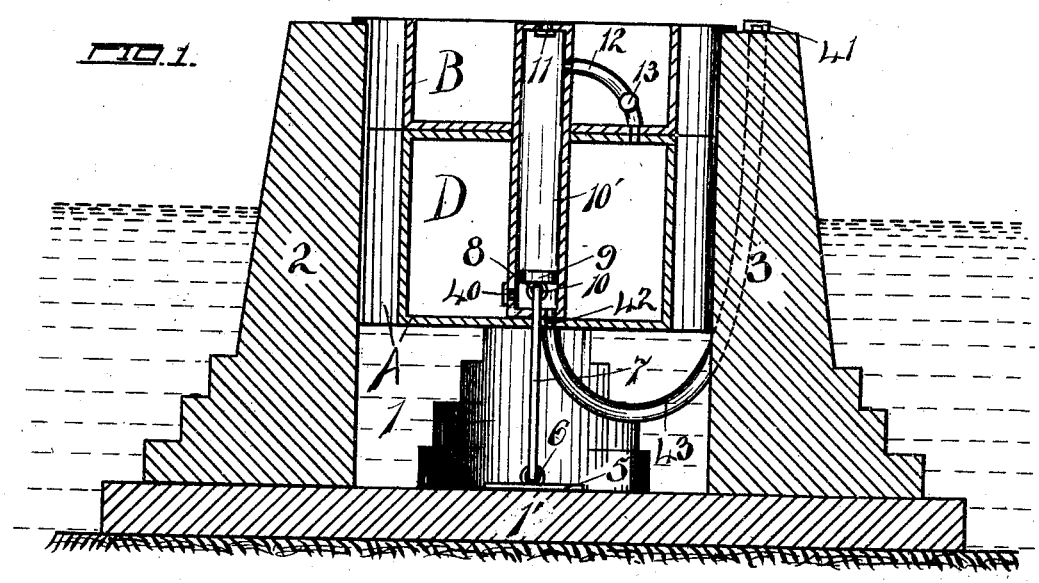
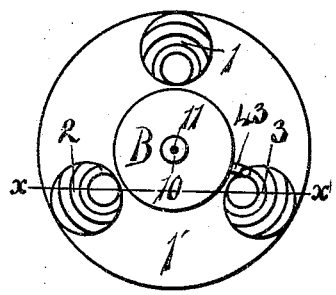
WITNESSES:
T. G. Larson.
N. P. Baker
INVENTOR:
Geo. W. Hazel.
Geo. W. Sues.
Attorney.

No. 775,421.

Patented November 22, 1904.

UNITED STATES PATENT OFFICE.

GEORGE W. HAZEL, OF AURORA, ILLINOIS.

TIDE AND WAVE MOTOR.

SPECIFICATION forming part of Letters Patent No. 775,421, dated November 22, 1904.

Application filed April 21, 1903. Serial No. 153,667. (No model.)

*To all whom it may concern:*

Be it known that I, GEORGE W. HAZEL, residing at Aurora, in the county of Kane and State of Illinois, have invented certain useful Improvements in Tide and Wave Motors; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in tide and wave motors.

The aim of my invention is to provide a mechanism to use, utilize, and convert into force the power of waves and the movement of a floating body in water, to utilize the rise and fall of that body in response to the wave or water action upon said body.

By means of my invention I am enabled to utilize the power of waves, the tides, and swells and convert the same into motive force.

In the accompanying drawings I have shown in Figure 1 a mechanism by means of which I utilize waves and tides to compress air, while Fig. 2 shows a top view of Fig. 1.

As has been set forth, the aim of my invention is to provide a means to utilize the power of waves, swells, and tides. This I accomplish in providing a base 1, as shown in Fig. 1, preferably of masonry, from which base extends upward a suitable distance a plurality of piers 1, 2, and 3. Held between these piers is a vessel A, preferably circular, as shown in Figs. 1 and 2, which vessel is permitted an up-and-down movement within the confines of the piers 1, 2, and 3, and this up-and-down movement of this vessel A in response to the action of the tide, swells, or waves is utilized in compressing air, which is stored within a suitable receiver.

In fulfilling the aim of my invention I provide the base 1 with a suitable anchor-plate 5, having an ear 6, and from this ear 6 extends a connecting-rod 7.

The housing A, held between the piers 1, 2, and 3, embodies a lower air-chamber D, provided with one or more cylinders, as 10, within which reciprocates a suitable piston 9, provided with an ear 10, secured to the connecting-rod 7. This cylinder 10 extends upward a suitable distance and above is provided with a suitable intake-valve 11, while extending from this cylinder 10 is a supply-pipe 12, provided with a check-valve 13 of any suitable construction. This supply-pipe 12 enters the receiver or air-chamber D, as is disclosed in Fig. 1. Above the air chamber or receiver D is provided a deck or housing B, adapted to contain the machinery and provide quarters for the attendants in charge of this apparatus. Now these instrumentalities are so constructed and arranged that when the tide is at its highest level the vessel will of course be at its highest position, in which condition the piston 9 will be at its lowermost position with the cylinder 10. Now as the tide recedes the vessel sinks, so that the air within the cylinder 10 is compressed, finding an escape through the valve-provided pipe 12 and being stored within the receiver D. As the vessel rises in obedience to the action of the tide the piston, being stationary, of course, finally comes within the lower portion of the cylinder 10, the compressed air being prevented from escaping by means of a check-valve 13, while the intake-valve 11 permits a free entry of air, and as soon as the tide recedes the air is again compressed. However, the action of the waves and swells is also utilized, and at every upward movement of the vessel air is taken in, and at every downward movement of the vessel air is compressed. Now in order to utilize the upward movement of the vessel I provide the cylinder 10 with a head 42, through which the connecting-rod 7 extends, and provide the check-valve 40, leading into the receiver or air-chamber D. As this head 42 is below the water-line, I extend from the same a suitable tube 43, which is led upward a suitable distance and above is provided with a check-valve 41, so that at every up or down movement the air is compressed upon one side or the other, the air always being taken in on the side opposite the one in which the compression is taking place.

Having thus described my said invention, what I claim as new, and desire to secure by United States Letters Patent, is—

In a device of the character described, the combination with a plurality of partially-submerged piers, of a buoyant housing confined by said piers, an air-receiver within said housing, a cylinder vertically positioned within said housing, a valve within the lower end of said cylinder, a valve within the upper end of said cylinder, a piston within said cylinder, a rod extending from said piston and being suitably anchored, said valves emptying into said air-receiver, an intake leading into said cylinder from above, an intake leading into said cylinder from below, all arranged substantially as and for the purpose set forth.

In testimony whereof I affix my signature in presence of two witnesses.

GEORGE W. HAZEL.

Witnesses:
HARRY NOTT,
GEORGE W. SUES.